US008254448B2

United States Patent
Fuchigami

(10) Patent No.: US 8,254,448 B2
(45) Date of Patent: Aug. 28, 2012

(54) MOVING PICTURE DISPLAY APPARATUS

(75) Inventor: Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1096 days.

(21) Appl. No.: 12/100,881

(22) Filed: Apr. 10, 2008

(65) Prior Publication Data

US 2008/0253453 A1 Oct. 16, 2008

(30) Foreign Application Priority Data

Apr. 11, 2007 (JP) ................ 2007-103628

(51) Int. Cl.
*H04N 7/12* (2006.01)
(52) U.S. Cl. ............. 375/240.12; 375/240; 345/604
(58) Field of Classification Search ........... 375/240
See application file for complete search history.

(56) References Cited

U.S. PATENT DOCUMENTS

| 6,452,579 | B1 | 9/2002 | Itoh | |
|---|---|---|---|---|
| 6,654,504 | B2 * | 11/2003 | Lubin et al. | 382/254 |
| 7,404,645 | B2 * | 7/2008 | Margulis | 353/31 |
| 7,667,777 | B2 * | 2/2010 | Lee | 348/687 |
| 7,705,874 | B2 * | 4/2010 | Du Breuil | 348/14.01 |
| 2002/0190940 | A1 | 12/2002 | Itoh | |
| 2003/0076886 | A1 | 4/2003 | Nagata | |
| 2006/0125771 | A1* | 6/2006 | Inuzuka et al. | 345/102 |
| 2008/0180456 | A1* | 7/2008 | Karlov et al. | 345/603 |

FOREIGN PATENT DOCUMENTS

| JP | 6-160811 | 6/1994 |
|---|---|---|
| JP | 2000-284755 | 10/2000 |
| JP | 2002/271809 | 9/2002 |
| JP | 2002-366121 | 12/2002 |

* cited by examiner

*Primary Examiner* — Jay Patel
*Assistant Examiner* — Jessica Prince
(74) *Attorney, Agent, or Firm* — Wenderoth, Lind & Ponack, L.L.P.

(57) ABSTRACT

Provided is a moving picture display apparatus displaying, on a liquid crystal panel or the like, moving picture data generated by encoding according to a predictive encoding method. In parallel with picture decoding processing, the moving picture display apparatus finds minimum values and maximum values of YUV data of a picture being decoded, and when the picture is being displayed, performs backlight control based on an upper bound value of RGB data found from YUV data of the picture.

7 Claims, 13 Drawing Sheets

FIG. 3

| PICTURE NUMBER | Y COMPONENT MAX VALUE | U COMPONENT MAX VALUE | U COMPONENT MIN VALUE | V COMPONENT MAX VALUE | V COMPONENT MIN VALUE |
|---|---|---|---|---|---|
| ⋮ | ⋮ | ⋮ | ⋮ | ⋮ | ⋮ |
| k+3 | 200 | 221 | 121 | 62 | 32 |
| ⋮ | ⋮ | ⋮ | ⋮ | ⋮ | ⋮ |
| k | 128 | 213 | 13 | 112 | 98 |

MOVING PICTURE DISPLAY APPARATUS

BACKGROUND OF THE INVENTION (1) Field of the Invention

The present invention relates to a moving picture display apparatus that decodes and displays encoded moving picture data, and in particular to a light source control technique when displaying moving pictures on a liquid crystal display.

(2) Description of the Related Art

Liquid crystal displays (hereinafter referred to as LCDs), which are non-self-lighting, use a light source such as an external light or a backlight, and can be classified as transmissive, reflective, or projective according to the positional relationship between the light source and the liquid crystal panel.

Although higher screen luminosity is not necessarily better in an LCD, it can be said that basically text and images displayed on the screen can be seen more easily if the screen is brighter when the screen is viewed in a bright room or from a distance.

However, increasing the luminosity of the screen, in other words, the brightness of the light source, causes problems such as light leakage which causes black to appear less black on the actual screen, and increased heat emission by the light source.

In response to such problems, there are techniques that control the intensity of the light source in accordance with the brightness of the image to be displayed on the screen. This reduces the problem of black appearing less black, and also reduces the heat emission and power consumption by the light source (see Patent Document 1).

Referring to the block diagram in FIG. 13, a brief description is given of the image display apparatus disclosed in Patent Document 1. This image display apparatus receives an image in a YUV format that is a luma and chrominance format, converts the received image into an RGB image, and displays the RGB image.

A YUV-RGB conversion unit 31 converts a signal S31, which consists of a luma signal (Y) and chrominance signals (U and V) input in the YUV format as an image signal, into a primary color signal S34 in RGB format. In parallel with this conversion, a peak detection unit 32a detects a peak value S32 of the luma signal Y which shows the luma component of the input signal S31. The image display apparatus performs contrast correction with respect to the primary color signal S34 and the intensity of the light source 35 in accordance with this peak value, and displays a resultant image.

Adjusting the intensity of the light source and correcting the contrast in accordance with the peak value of the luminosity reduces the problem of black not appearing black in an image having low luminosity, and also heat emission and power consumption by the light source.

Patent Document 1: Japanese Unexamined Patent Application Publication No. H06-160811

However, it is not until after input of the image signal of the image to be displayed has ended that the peak value of the Y component is found. In other words, it is when input of the image signal of one display screen has finished that the peak value of the image signal of that display screen is found.

Consequently, when the peak value is found, the image signal of the display screen has already been converted into RGB and displayed. In other words, the peak value used to control the intensity of the light source and the like is the peak value found based on the previous display screen. This means that the peak value used in light source intensity control and contrast correction is not the peak value of the display screen being displayed.

This is problematic because in cases where, for example, the display screen changes from being a display screen having low luminosity to a display screen having high luminosity, the screen is not displayed appropriately because the control is not performed appropriately.

This problem can be solved by providing a memory that can be used as a buffer to store one display screen. However, since one display screen consists of a large amount of image data, problems of increases in circuit scale and cost arise if a large-capacity memory is added.

SUMMARY OF THE INVENTION

In view of the stated problems, the present invention has an object of providing a moving picture display apparatus that, when a screen is displayed, is capable of controlling the amount of light from the light source and performing contrast correction using the peak value of the image signal of the display screen being displayed, without the addition of a memory for storing one display screen.

In order to achieve the stated object, the moving picture display apparatus of the present invention is a moving picture display apparatus for displaying moving picture data generated by encoding according to a predictive encoding method, the moving picture display apparatus including: a liquid crystal panel unit; a light source operable to illuminate the liquid crystal panel unit; a decoding unit operable to decode the moving picture data according to a decoding method corresponding to the predictive encoding method, thereby generating YUV pictures, each YUV picture being composed of, for each pixel of a display screen, a Y component that is a piece of luma data and a U component and a V component that are each chrominance data; a display control unit operable to convert each YUV picture pixel by pixel into a set of primary color data composed of an R component, a G component and a B component, and execute contrast control while causing the liquid crystal panel to display the sets of primary color data of each YUV picture; a YUV value detection unit operable to, while the decoding unit is generating each YUV picture, detect YUV value information that includes a maximum value of the luma data in the one of the YUV pictures currently being generated; and a light source control unit operable to control an amount of light emitted by the light source, based on the YUV value information detected from the one of the YUV pictures that the display control unit is currently causing the liquid crystal panel unit to display.

According to the stated structure, when decoding moving picture data to generate a YUV picture, the maximum value of the Y component of that picture is detected. Therefore, when that YUV picture is converted to RGB data and displayed on the liquid crystal panel, it is possible to control the light amount of the light source based on the maximum value of the Y component of that picture. Furthermore, as a result of controlling the intensity of the light source, it is possible to reduce power consumption when displaying moving picture data.

Here, each YUV value information further may include a maximum value and a minimum value of each chrominance data in the respective YUV picture, the moving picture display apparatus may further include: an upper bound value calculation unit operable to find, for each YUV picture, an upper bound value of all the sets of primary color data of the YUV picture, based on the detected YUV information in the YUV picture, and the light source control unit may control the amount of light based on the upper bound value found with respect to the YUV picture that the display control unit is causing the liquid crystal panel unit to display. Furthermore, the upper bound value calculation unit may find, for each YUV picture, upper bound values Ru, Gu and Bu of the R component, the G component and the B component, respectively, in all the sets of primary color data for the YUV picture, and select the greatest one of Ru, Gu and Bu as the upper bound value, the upper bound value calculation unit finding Ru, Gu and Bu according to the following operations derived from a triangle inequality in a max norm and a conversion formula for converting to primary color data $Ru = Y\mathrm{max} + 1.40 V\mathrm{max}$ $Gu = Y\mathrm{max} + 0.34 U\mathrm{min} + 0.71\ V\mathrm{min}$ $Bu = Y\mathrm{max} + 1.77 U\mathrm{max}$ where Y max is a maximum value of luma data in the YUV picture, Umax and Vmax are each a maximum value of a respective one of the chrominance data, and Umin and Vmin are minimum values of a respective one of the chrominance data.

According to the stated structure, in addition to the maximum value of the Y component, the moving picture display apparatus detects the maximum value and the minimum value of the U component and the V component as YUV value information, and based on these values, finds an upper bound value of primary color data obtained by converting the YUV picture into primary color data. Therefore, it is possible to control the light amount of the light source based on a value that is not below the maximum value of the primary color data of the frame displayed on the liquid crystal panel.

In other words, for any moving picture, for example even a moving picture in which a switch is made from a low-luminosity picture to a high-luminosity picture, a value equal to or greater than the maximum value of the primary color data is always obtained as the upper bound value, and therefore a favorable image can be displayed without the problem of an excessive reduction in light source intensity. In addition, a favorable image can similarly be displayed even in the case of an image that is close to a pure color for which high primary color values occur with respect to the luma value that is the Y component.

Here, the light source may emit red light, green light and blue light, the upper bound value calculation unit may find, for each YUV picture, upper bound values Ru, Gu and Bu of the R component, the G component and the B component, respectively, in all the sets of primary color data for the YUV picture, the upper bound value calculation unit finding Ru, Gu and Bu according to the following operations derived from a triangle inequality in a max norm and a conversion formula for converting to primary color data $Ru = Y\mathrm{max} + 1.40 V\mathrm{max}$ $Gu = Y\mathrm{max} + 0.34 U\mathrm{min} + 0.71\ V\mathrm{min}$ $Bu = Y\mathrm{max} + 1.77 U\mathrm{max}$ where Y max is a maximum value of luma data in the YUV picture, Umax and Vmax are each a maximum value of a respective one of the chrominance data, and Umin and Vmin are minimum values of a respective one of the chrominance data, and the light source control unit may control the amount of light emitted by the light source with respect to the YUV picture being displayed by the liquid crystal panel unit, by controlling the amount of each of the red light, green light and blue light that the light source emits, based on the respective one of the found upper bound values Ru, Gu and Bu of the YUV picture that the display control unit is causing to be displayed.

According to the stated structure, even in a moving picture display apparatus that displays using a prism to consolidate video of the three primary colors red, green and blue, the upper bound value of the respective colors of the light emitted by each of the light sources can be found, and each light source controlled based on the respective upper bound value. Therefore, favorable image display can be performed.

Here, while the decoding unit may generate each YUV picture, the YUV value detection unit performs in parallel the detection of the YUV value information of the YUV picture being generated.

According to the stated structure, since the decoding of a YUV picture and the detection of the YUV value information are performed in parallel, when a YUV picture is generated, the YUV value information of that YUV picture is also detected.

In other words, since the YUV value information is detected during the process of decoding the picture, when one picture has been decoded and processing to convert the picture to primary color data starts, the maximum value of the Y component and the maximum and minimum values of the U and V components have already been determined. Therefore, when the picture is displayed, the upper bound value of the primary color data obtained from converting the YUV picture into primary color data can be used in light source control and contrast correction with respect to the picture.

Here, the decoding unit may include a storage unit operable to store each detected YUV value information in correspondence with information specifying the corresponding YUV picture when the YUV pictures are being generated, and the light source control unit may perform the control of the light amount of the light source based on the YUV information stored in correspondence with the information specifying the one of the YUV pictures that the display control unit is causing the liquid crystal panel to display.

According to the stated structure, the YUV value information is stored in correspondence with information specifying the corresponding picture. Therefore, even if the YUV picture is not displayed soon after being generated, when that YUV picture is converted to primary color data and displayed on the liquid crystal panel, the upper bound value of the primary color data obtained from converting the YUV picture into primary color data can be used in light source control and contrast correction with respect to the picture.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 3 shows an example of the structure and content of YUV component information 1220 stored in a YUV value storage unit 1210;

NUMERICAL REFERENCES

10 Moving picture display apparatus
1000 Decoding control unit
2000 Upper bound value calculation unit
3000 Backlight control unit
4000 YUV-RGB conversion unit
5000 Contrast correction unit
6000 Backlight
7000 Liquid crystal panel
1100 Variable length decoding unit
1120 Reverse quantization and reverse orthogonal transformation unit
1130 Addition unit
1140 In-loop filter unit
1150 Motion compensation unit
1200 YUV value detection unit
1210 YUV value storage unit

DESCRIPTION OF THE PREFERRED EMBODIMENTS

First Embodiment

Overview

In the moving picture display apparatus of the present invention, the maximum value of the Y component for use in control of the backlight is found at the stage of generating YUV-format moving image data, rather than after reading the YUV-format moving image data.

Referring to a timing chart, a description is now given of how the moving picture display apparatus of the present embodiment is able to, when displaying a YUV-format picture, use the YUV values of that picture to control the backlight, by finding the maximum value of the Y component at the stage of generating YUV-format moving picture data. It should be noted that in the present embodiment, the term picture is used as a general term that refers to a single frame that is a single display image, or a single field.

Figure 4:
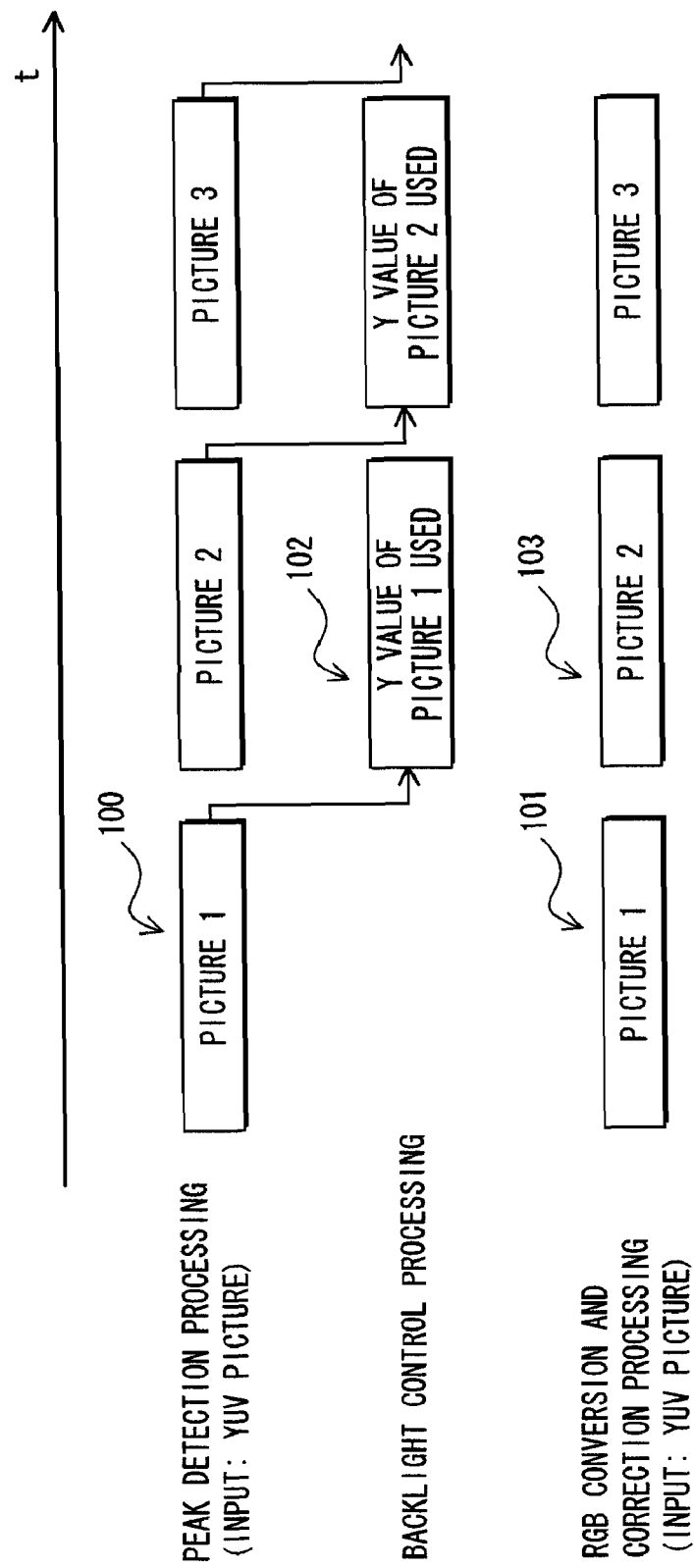
FIG. 4 is a timing chart pertaining to a conventional image display apparatus.
Figure 5:
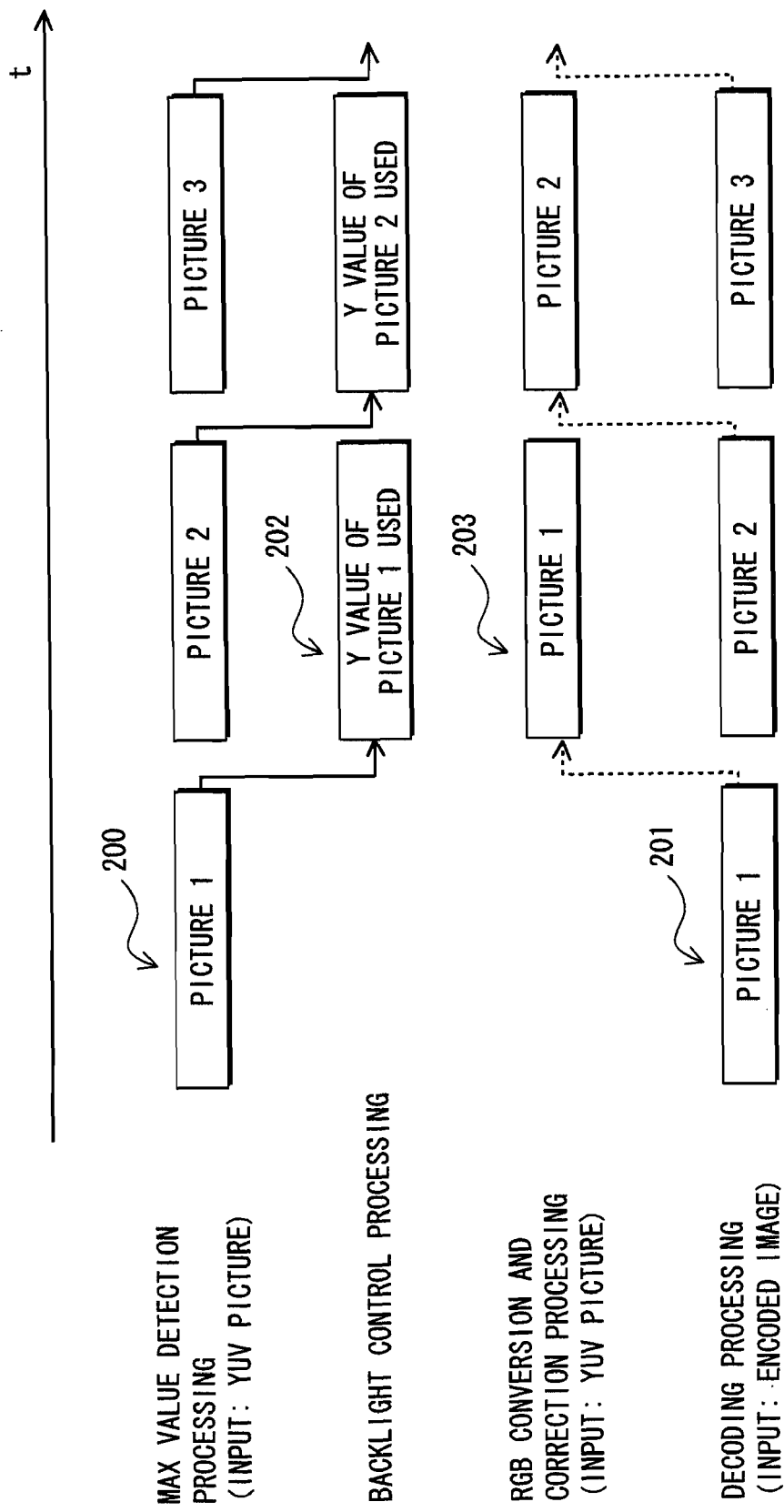
FIG. 5 is a timing chart pertaining to the moving picture display apparatus of a first embodiment of the present invention.
Figure 13:
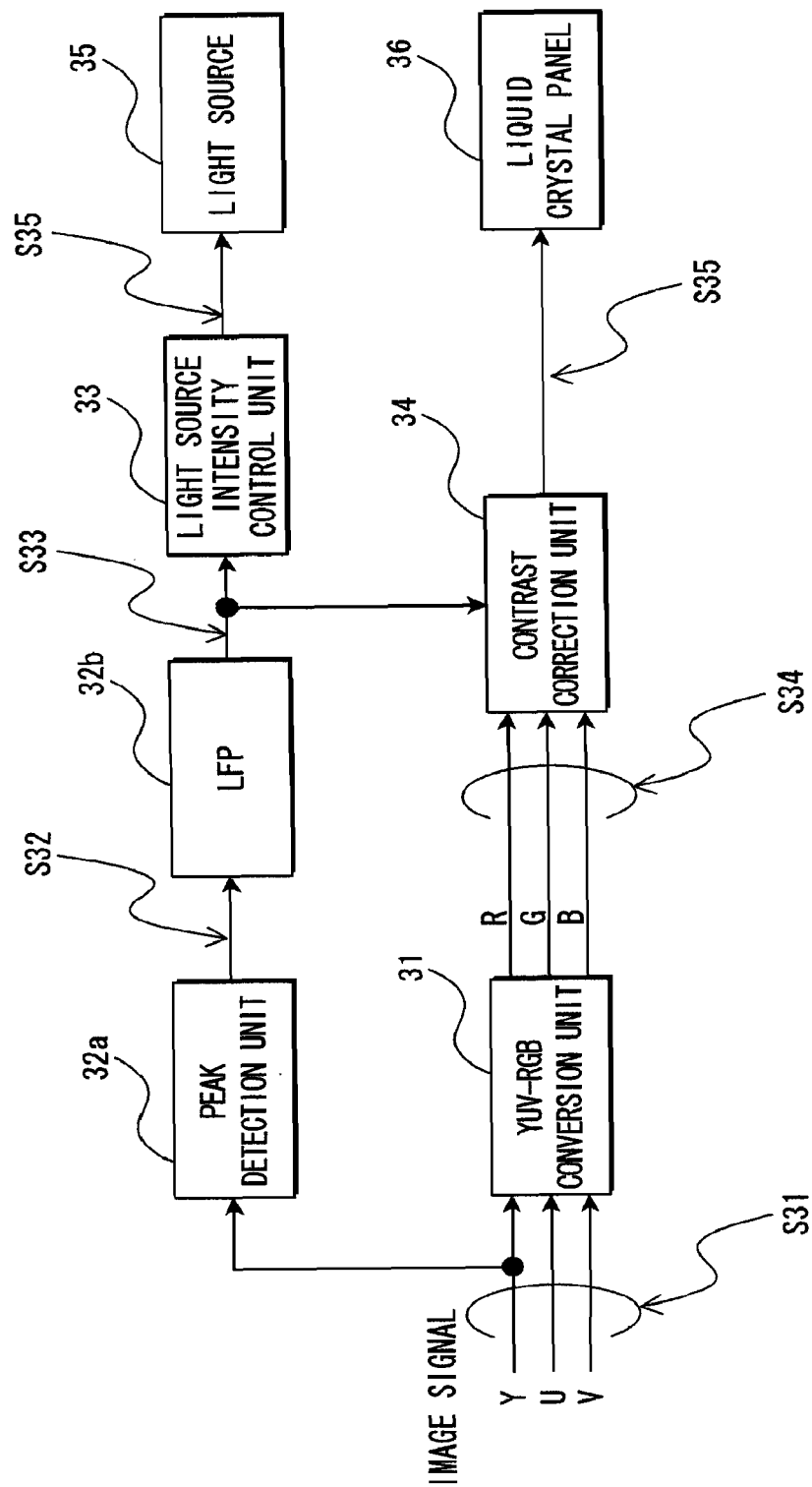
FIG. 13 is a block diagram showing the structure of a conventional moving picture decoding apparatus.

First, referring to FIG. 4, a description is given of the timing with which the conventional image display apparatus of FIG. 13 finds the maximum value of the Y component of a displayed picture. Referring then to FIG. 5, a description is given of the timing with which the moving picture display apparatus of the present embodiment finds the maximum value of the Y component.

FIG. 4 is a timing chart pertaining to the conventional image display apparatus described with reference to FIG. 13. In FIG. 4, the rectangles express when certain processing is being performed, and written in each rectangle is the name of the picture that is the target of that processing. Although the rectangles are shown separate to each other, the rectangles are assumed to be temporally consecutive in reality. The solid-line arrows represent transmission of the maximum value of the Y component. This also applies to FIG. 5.

The peak detection processing in the first row expresses when the peak detection unit 32a is detecting a peak. The backlight control processing in the second row expresses when the light source intensity control unit 33 is controlling the light source. The RGB conversion and correction processing in the third row is processing performed by the YUV-RGB conversion unit 31 and the contrast correction unit 34, and expresses when pictures are displayed on the liquid crystal panel.

As shown in FIG. 4, the peak detection processing 100 with respect to picture 1, and the RGB conversion and correction processing 101 with respect to picture 1 are performed in parallel. This means that the maximum value of the Y component of picture 1 is found when the RGB conversion and correction processing 101 finishes.

Consequently, with the conventional image display processing, when RGB conversion and correction processing 103 is performed with respect to picture 2 and picture 2 is being displayed on the liquid crystal panel 36, the light source intensity control unit 33 is outputting a control signal S35 that uses the maximum value of the Y component of picture 1 to the light source 35, and performing backlight control processing 102 using that control signal S35.

Problems particularly arise in this conventional display apparatus when a dramatic change occurs from a picture having low luminosity to a picture having high luminosity. This is because the peak value used to control the backlight and correct the contrast when the high-luminosity picture is displayed is the peak value detected from the low-luminosity picture. Therefore, when the high-luminosity picture is displayed, the intensity of the light source is reduced in accordance with the low luminosity, and the resultant amount of light is insufficient to display a high-luminosity picture. In correcting the contrast, a high gain is applied in accordance with the low luminosity, and this causes saturation in the resultant image signal, and prevents image display from being performed appropriately.

In view of this problem, a low pass filer is applied to the peak value (see LFP 32b in FIG. 13) to suppress the dramatic fluctuation in the control and correction. While this is able to ease the problem, unless simultaneousness of the peak value and the corrected picture is guaranteed, the problem will not be completely resolved. Furthermore, applying a low pass filter causes loss in the control followability, and therefore is disadvantageous in terms of failing to obtain sufficient reduction in power consumption and heat emission by the light source that would be expected to be obtained by adaptively controlling the light source intensity.

FIG. 5 is a timing chart pertaining to the moving picture display apparatus of the present embodiment.

The first row expresses when the maximum value of the Y component of pictures is being found. The second row is backlight control processing, and expresses when the backlight is being controlled. The third row is RGB conversion and contrast correction, and expresses when pictures are displayed on the liquid crystal panel. The fourth row is processing for decoding the encoded moving picture data, and expresses when decoding is carried out. The broken line arrows represent transmission of a decoded YUV-format picture.

As shown in FIG. 5, when RGB conversion and correction processing 203 is being carried out with respect to picture 1, in other words, when picture 1 is being displayed, backlight control processing 202 is being performed using the maximum value of the Y component of picture 1.

In the present moving picture display apparatus, decoding processing 201 with respect to picture 1 and maximum value detection processing 200 with respect to the Y component of picture 1 are being performed in parallel.

Consequently, the maximum value of the Y component has already been found at the time when the YUV-format picture is to be converted into an RGB-format picture, and therefore the peak value used in backlight control and contrast correction when the picture is displayed is the peak value of the same picture. Thus the moving picture display apparatus of the present embodiment solves the stated problems associated with the conventional image display apparatus.

Furthermore, the moving picture display apparatus of the present embodiment enables more appropriate image display due to that fact that the image data provided to the liquid crystal panel is a primary color signal.

Given that the image data provided to the liquid crystal display is a primary color signal in the present embodiment, the control of the amount of light from the light source and the contrast correction are ideally performed using the maximum value of the R component, the G component and the B component.

This is because, given that the peak value of the luminosity and the peak value of the primary color signal do not match, when only the peak value of the luminosity is used in light source control and contrast correction, image display may not be able to be performed appropriately because of insufficient light source intensity and saturation occurring in the corrected image signal.

In view of this problem, the moving picture display apparatus of the present embodiment finds a value that is not lower the R, G and B components of RGB data to be displayed, and performs light source control and contrast correction using that value.

The following describes the moving picture display apparatus of an embodiment of the present invention with reference to the drawings. Note that the present embodiment describes a case of displaying moving picture data created in accordance with the MPEG-4 standard.

Structure

Figure 1:
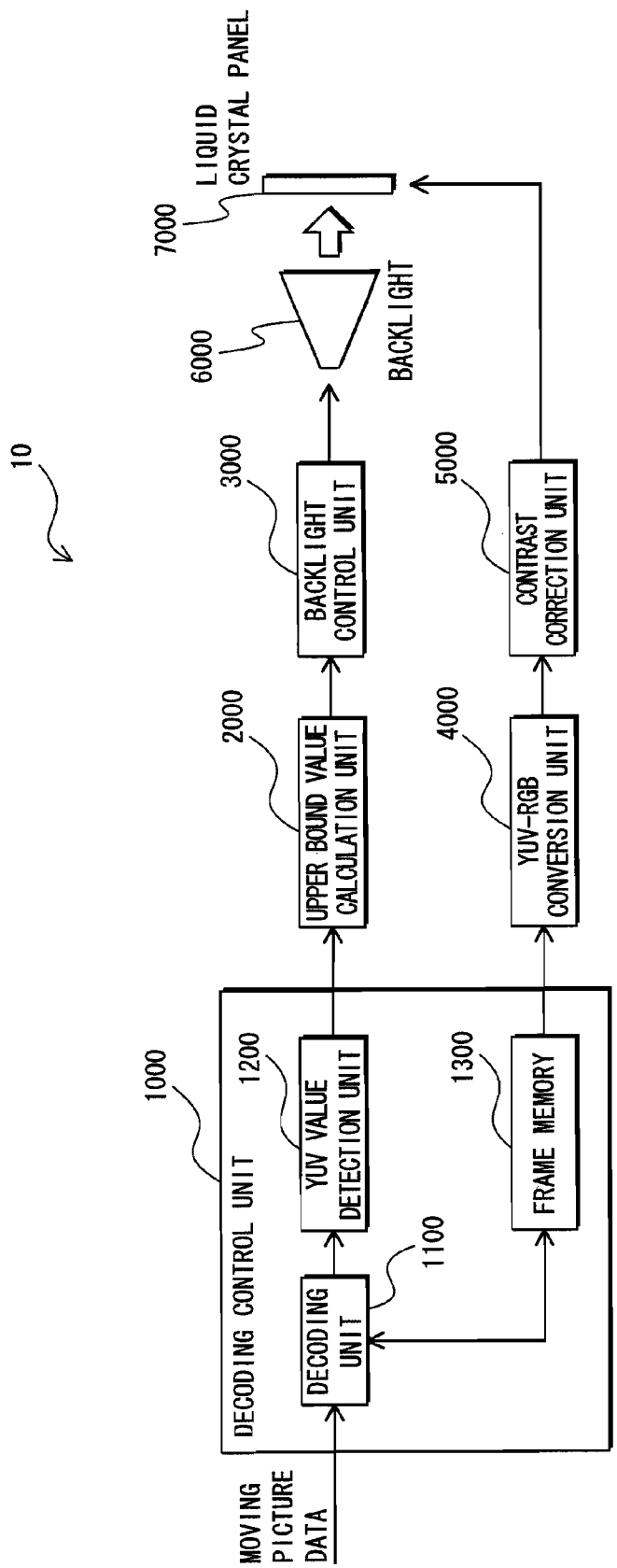
FIG. 1 is a block diagram showing the structure of a moving picture display apparatus 10.

FIG. 1 is a block diagram showing the structure of a moving picture display apparatus 10.

The moving picture display apparatus 10 is composed of a decoding control unit 1000, an upper bound value calculation unit 2000, a backlight control unit 3000, a YUV-RGB conversion unit 4000, a contrast correction unit 5000, a backlight 6000 and a liquid crystal panel 7000.

The decoding control unit 1000 has a function of decoding input encoded moving picture data, and successively outputting the resultant data in accordance with the display timing of pictures.

The decoding control unit 1000 includes a decoding unit 1100, a YUV value detection unit 1200 and a frame memory 1300. The decoding unit 1100 has a function of decoding the encoded moving picture data, thus generating a YUV picture in a luma and chrominance format, and storing the YUV picture to the frame memory 1300. The YUV value detection unit 1200 has a function of finding the maximum values and the minimum values of the YUV components of the YUV picture being generated.

Note that it is assumed that the moving picture data is data that has been obtained by compressing an image based on a spatial frequency component, and that the unit of compression is a predetermined number of pixels in a square shape on the screen. This unit of compression is called a macroblock, and each screen consists of a plurality of macroblocks. Each macroblock consists, for instance, of 16 pixels×16 pixels. Decoding processing is also performed in units of macroblocks. Details of the decoding control unit 1000 are given later referring to FIG. 2.

The backlight 6000 lights the liquid crystal panel 7000 from the back side thereof, providing white light.

The liquid crystal 7000 is a transmissive liquid crystal panel, and in performing image display, controls the amount of light transmitted from the back light 6000 with respect to each sub-pixel.

The upper bound value calculation unit 2000 has a function of finding the RGB upper bound value of a picture from the maximum and minimum values of the corresponding YUV components found by the YUV value detection unit 1200. This RGB upper bound value is a value that is not lower than the value of each of the R component, the G component and the B component of all pixels when the YUV picture has been converted into primary color data. A description of how the upper bound value is found is given later.

The backlight control unit 3000 has a function of controlling the intensity of light from the backlight 6000. The backlight control unit 3000 performs this control based on the RGB upper bound value.

More specifically, the backlight control unit 3000 outputs control data to the backlight 6000 such that the intensity of the light from the backlight 6000 is controlled in direct proportion to the upper bound value. In reality, the control data is also subjected to gamma correction and the like and passed to the backlight 6000.

The YUV-RGB conversion unit 4000 has a function of converting a YUV picture output from the frame memory 1300 into RGB data.

The contrast correction unit 5000 has a function of performing contrast correction of RGB data in order to adjust the display result in accordance with the control of the intensity of the light emitted from the backlight 6000 by the backlight control unit 3000. The contrast correction is performed by correcting the RGB signal provided to the liquid crystal panel 7000 with use of a gain of the reverse proportion of a value for controlling the backlight, here the RGB upper bound value, in a correspondence with the intensity control of the backlight 6000. This correction allows the display result to be the same as if the light emission intensity of the backlight is not controlled.

Figure 2:
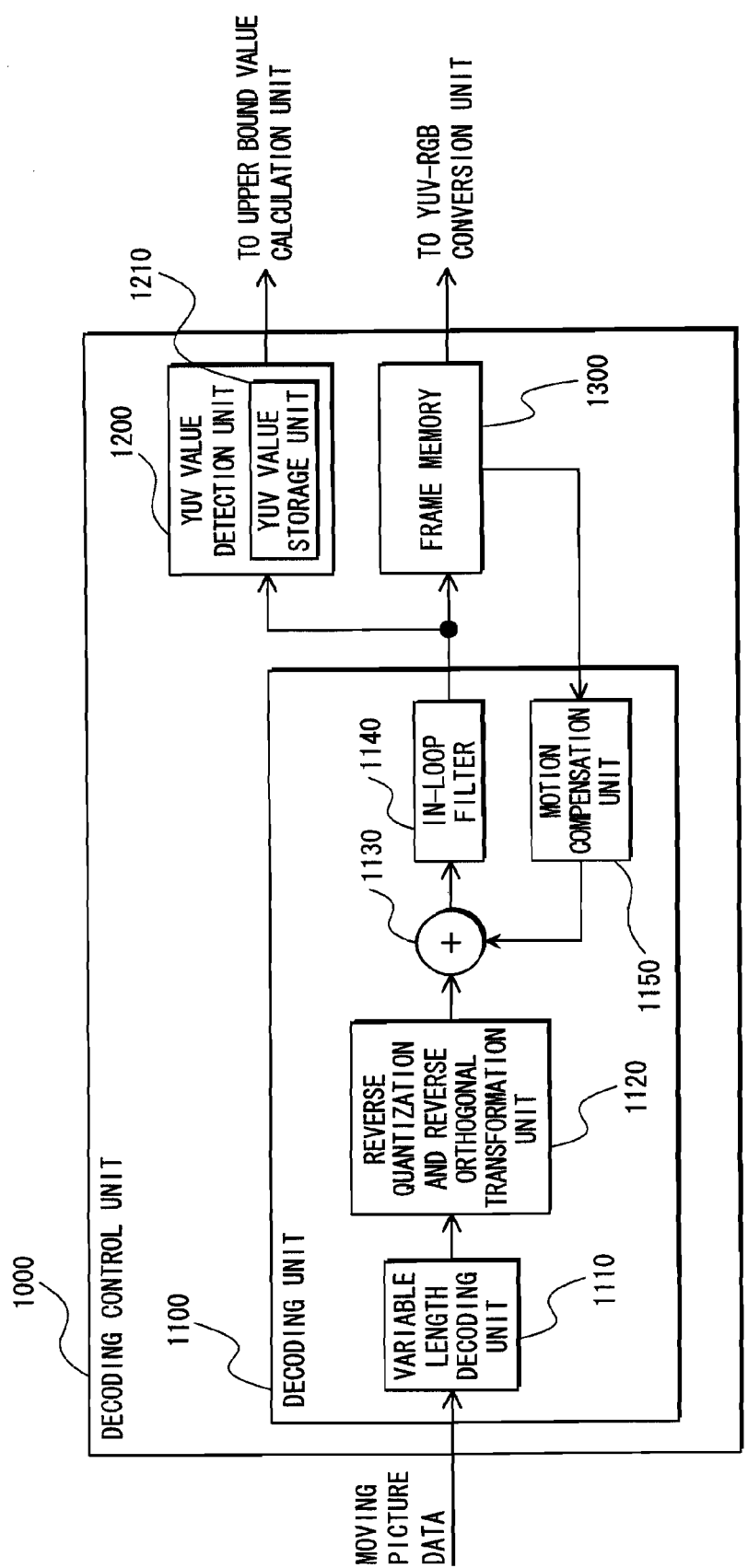
FIG. 2 is a block diagram showing the structure of a decoding control unit 1000.

Referring now to FIG. 2, a detailed description is given of the decoding control unit 1000.

The decoding control unit 1000 is composed of the decoding unit 1100, the YUV value detection unit 1200 and the frame memory 1300, and has two principal functions. The first is a function of decoding the input encoded moving picture data, and accumulating the resultant YUV-format pictures in the frame memory 1300. The second is a function of successively outputting the accumulated YUV pictures from the frame memory 1300 in order of display and in accordance with the display timing.

The decoding unit 1100 is composed of a variable length decoding unit 1110, a reverse quantization and reverse orthogonal transformation unit 1120, an addition unit 1130, an in-loop filter 1140, and a motion compensation unit 1150.

The function units in the decoding unit 1100 are basically the same as those in a conventional decoding apparatus, with the exception that the data obtained as a result of decoding is output not only to the frame memory 1300, but also to the YUV value detection unit 1200. The decoding is performed in units of the macroblocks constituting the picture, and data obtained as a result of decoding a macroblock is output to the frame memory 1300 and the YUV value detection unit 1200.

The variable length decoding unit 1110 receives input, from an external source, of moving picture data that is a code sequence of moving pictures encoded in an MPEG-4 format. Upon receiving the input, the variable length decoding unit 1110 performs variable length decoding, and separates picture type information, macroblock type information, motion information, quantization coefficients, and the like. The variable length decoding unit 1110 outputs the quantization coefficients to the reverse quantization and reverse orthogonal transformation unit 1120, and the other separated information including the picture type in decoding processing is used in the decoding processing in the decoding unit 1100.

The reverse quantization and reverse orthogonal transformation unit 1120 performs reverse quantization and reverse orthogonal transformation with respect to the quantization coefficients separated for each block, and thereby obtains pixel data of each block. The reverse quantization and reverse orthogonal transformation unit 1120 outputs the obtained pixel data to the addition unit 1130.

The addition unit 1130 outputs each block of pixel data to the in-loop filter 1140, either after having added a prediction signal from the motion compensation unit 1150 to the block of pixel data, or as is without having added a prediction signal. Whether or not a prediction signal is added is determined according to the type of encoding shown by the macroblock type information.

The in-loop filter 1140 performs filter processing on an image received from the addition unit 1130, and thereby generates a decoded image. The filter processing is, for instance, processing to apply a deblocking filter to smooth sharp edges in the blocks. The in-loop filter 1140 outputs the generated decoded image to the frame memory 1300 and the YUV value detection unit 1200.

The motion compensation unit 1150 calculates a prediction signal of the block being decoded, based on the pictures accumulated in the frame memory 1300 and the information separated by the variable length decoding unit 1110 including the macroblock type information and the motion information.

The frame memory 1300 has a function of accumulating images output from the in-loop filter 1140. The frame memory 1300 receives input of pixel data in macroblock units from the in-loop filer 1140, and stores the received pixel data in units of pictures.

Each picture is composed of YUV components. More specifically, the value of each of the Y component, the U component and the V component is stored for each pixel. The accumulated pictures are referenced by the motion compensation unit 1150 as necessary.

The frame memory 1300 also has a function of receiving an instruction from the decoding control unit 1000 designating a picture, and outputting the designated picture to the YUV-RGB conversion unit 4000.

The YUV value detection unit 1200 includes a YUV value storage unit 1210 that stores the maximum value of the Y component, and the maximum and minimum values of each of the U component and the V component of each picture. Hereinafter, the term YUV values is used to refer to all of these values collectively.

The YUV value detection unit 1200 has a function of finding the YUV values of a picture being decoded, and storing the found YUV values in the YUV value storage unit 1210. More specifically, the YUV value detection unit 1200 finds the YUV values of a macroblock input from the in-loop filter 1140, and finds the YUV values of a picture composed of a plurality of macroblocks. Details of this processing are given in the section Operations with reference to FIG. 10.

The found YUV values are stored in the YUV value storage unit 1210 in correspondence with the picture.

The YUV value detection unit 1200 also has a function of receiving an instruction from the decoding control unit 1000 designating a picture, and outputting the YUV values of the designated picture to the upper bound value calculation unit 2000.

Note that the moving picture display apparatus 10 also includes a CPU, a memory and the like that are not illustrated here. Part or all of the processing by the function units such as the decoding control unit 1000 of the moving picture display apparatus 10 is achieved by the CPU executing programs.

Method for Finding the Upper Bound Value

A description is now given of the upper bound value found by the upper bound value calculation unit 2000.

Ideally, the backlight control by the backlight control unit 3000 and the contrast correction by the contrast correction unit 5000 should use the maximum value of the R component, the G component and the B component (hereinafter referred to as the RGB maximum value) of the RGB data generated by converting the YUV picture.

However, in reality, since the RGB data is created in the processing by the YUV-RGB conversion unit 4000, it is not possible to find the RGB maximum value during decoding.

For this reason, in the present embodiment, an alternative value to the RGB maximum value is found based on the YUV picture that is obtainable during decoding. Put more accurately, an upper bound value that is not lower than the RGB maximum value is found.

It is possible to find the upper bound value using formulas used in YUV-RGB conversion, and a formula derived by applying triangle inequality in the max norm (also called the sup-norm).

The YUV-RGB conversion is the same as the conversion performed in the YUV-RGB conversion unit 4000. Examples of the conversion formulas are shown below.

Note that the term RGB picture is used hereinafter to refer to data obtained as a result of converting the pixels in a YUV picture into RGB data.

The conversion formula for red (R) is Expression 1, the conversion formula for green (G) is Expression 2, and the conversion formula for blue (B) is Expression 3.

$$Ri = Yi + 1.40 Vi \qquad \text{Expression 1}$$

$$Gi = Yi - 0.34 Ui - 0.71 Vi \qquad \text{Expression 2}$$

$$Bi = Yi + 1.77 Ui \qquad \text{Expression 3}$$

Here, Ri, Gi, and Bi represent the values of the red component (R), the green component (G), and the blue component (B), respectively, in an i-th pixel in the RGB picture. Yi, Ui, and Vi represent the luma component (Y) and the chrominance components (U and V), respectively, in the i-th pixel of the YUV picture.

The formula for calculating the upper bound value is derived according to the following process.

Ideally, the backlight control and the contrast correction are performed using a maximum value M relating to the RGB picture shown in Expression 4.

$$M=\max\{Ri, Gi, Bi\}=\max\{R\max, G\max, B\max\} \ (i=1,2,3,\ldots,N) \quad \text{Expression 4}$$

Here, Ri, Gi, and Bi represent the values of the red component (R), the green component (G), and the blue component (B), respectively, in the i-th pixel among all N pixels in the RGB picture. Rmax, Gmax and Bmax represent the maximum value of the red component, the maximum value of the green component and the maximum value of the blue component, respectively, in the RGB picture.

The maximum values Rmax, Gmax and Bmax of the primary color components are derived according to Expression 5, Expression 6 and Expression 7 by applying the triangle inequality in the max norm of the relational expressions Expression 1, Expression 2 and Expression 3 relating to YUV-RGB conversion.

$$R\max=\max\{Yi+1.40Vi\} \leq \max\{Yi\} + 1.40\max\{Vi\} \equiv R'\cdot u \quad \text{Expression 5}$$

$$G\max=\max\{Yi-0.34Ui-0.71Vi\} \leq \max\{Yi\} + 0.34\min\{Ui\}+0.71\min\{Vi\} \equiv G'u \quad \text{Expression 6}$$

$$B\max=\max\{Yi+1.77Ui\} \leq \max\{Yi\} + 1.77\max\{Ui\} \equiv B'u \quad \text{Expression 7}$$

Here, Yi, Ui and Vi represent the luma component (Y) and the chrominance components (U and V), respectively, in the i-th pixel of the YUV picture. R'u, G'u and B'u are definitions of the value of the right-hand side of the respective inequality.

It can be seen from the relationship between the inequalities Expression 5, Expression 6 and Expression 7 that R'u, G'u and B'u are the upper bound values of the R component, the G component and the B component, respectively. In other words, R'u pertaining to the R component is a value that is no lower than any Ri in the picture.

The following inequality Expression 8 is established from the aforementioned relationship.

$$M'=\max\{R'u, G'u, B'u\} \equiv M' \quad \text{Expression 8}$$

Here, M' is the definition of the value of the right-hand side of the inequality. This shows that M' is the upper bound value with respect to the RGB picture since $M \leq M'$.

Accordingly, the upper bound value of the RBG value is calculated as follows.

The upper bound values R'u, G'u and B'u of the primary color components are found by calculating the right hand sides of the inequalities of Expression 5, Expression 6 and Expression 7, with use of the maximum values and the minimum values of the YUV components. The upper bound value M' which is the right-hand side of the inequality of the Expression 8, in other words, the maximum value of the upper bound values R'u, G'u and B'u of the three primary color components, is the RGB upper bound value.

In this way, according to the formula for converting YUV data to RGB data and the formulas derived from the triangle inequality pertaining to the max norm (Expressions 5 to 8), an RGB upper bound value that is not lower than the RGB components of any pixel of the picture is calculated. This prevents problems of lack of intensity of the light source and saturation of the RGB data, and realizes favorable image reproducibility.

Data

Referring to FIG. 3, a description of the main data used in the moving picture display apparatus of the present embodiment is given.

FIG. 3 shows an example of the structure and content of YUV component information 1220 stored in the YUV value storage unit 1210.

The YUV component information 1220 is composed of picture number fields 1221, Y component max value fields 1222, U component max value fields 1223, U component min value fields 1224, V component max value fields 1225, and V component min value fields 1226.

Each picture number field 1221 shows a number that identifies a picture. Although notation such as "k+3" is used in FIG. 3 for convenience of explanation of the operations, any notation by which a picture can be identified may be used.

Each Y component max value field 1222 shows a maximum value of the Y component in all pixels of the picture identified in the corresponding picture number field 1221. In the present embodiment, the Y component is represented by a value from 0 to 255. This notation is also used for the other components.

Similarly, each U component max value field 1223 and each U component min value field 1224 shows a maximum value and a minimum value, respectively, of the U component of a corresponding picture, and each V component max value field 1225 and each V component min value field 1226 shows a maximum value and a minimum value, respectively; of the V component of a corresponding picture.

For instance, the maximum value of the Y component of a picture represented by "k" in one of the picture number fields 1221 is 128.

This YUV component information 1220 is referenced and read by the YUV value detection unit 1200 when the YUV value detection unit 1200 has received an instruction from the decoding control unit 1000, and the component information of the read picture is deleted from the YUV component information 1220. This is because the component information of a picture is referenced to display the picture, and is therefore no longer needed when that picture has been displayed.

Operations

Referring to FIGS. 6 to 11, a description is now given of operations of the moving picture display apparatus 10 of the present invention.

First a description is given of how moving picture data is displayed when the order in which the pictures are decrypted is the same as the order in which the pictures are displayed. This is followed by a description of how moving picture data is displayed when the decoding order and the display order are different to each other, and then a description is given of display processing.

The moving picture data is composed of three types of pictures, namely I pictures, B pictures, and P pictures. An I picture is a screen obtained by encoding using information only within that screen itself. A P picture is a screen obtained according to single direction predictive encoding with one other screen. A B picture is a screen obtained according to bi-directional predictive encoding with two other screens.

When the Decoding Order and the Display Order are the Same

Figure 6:
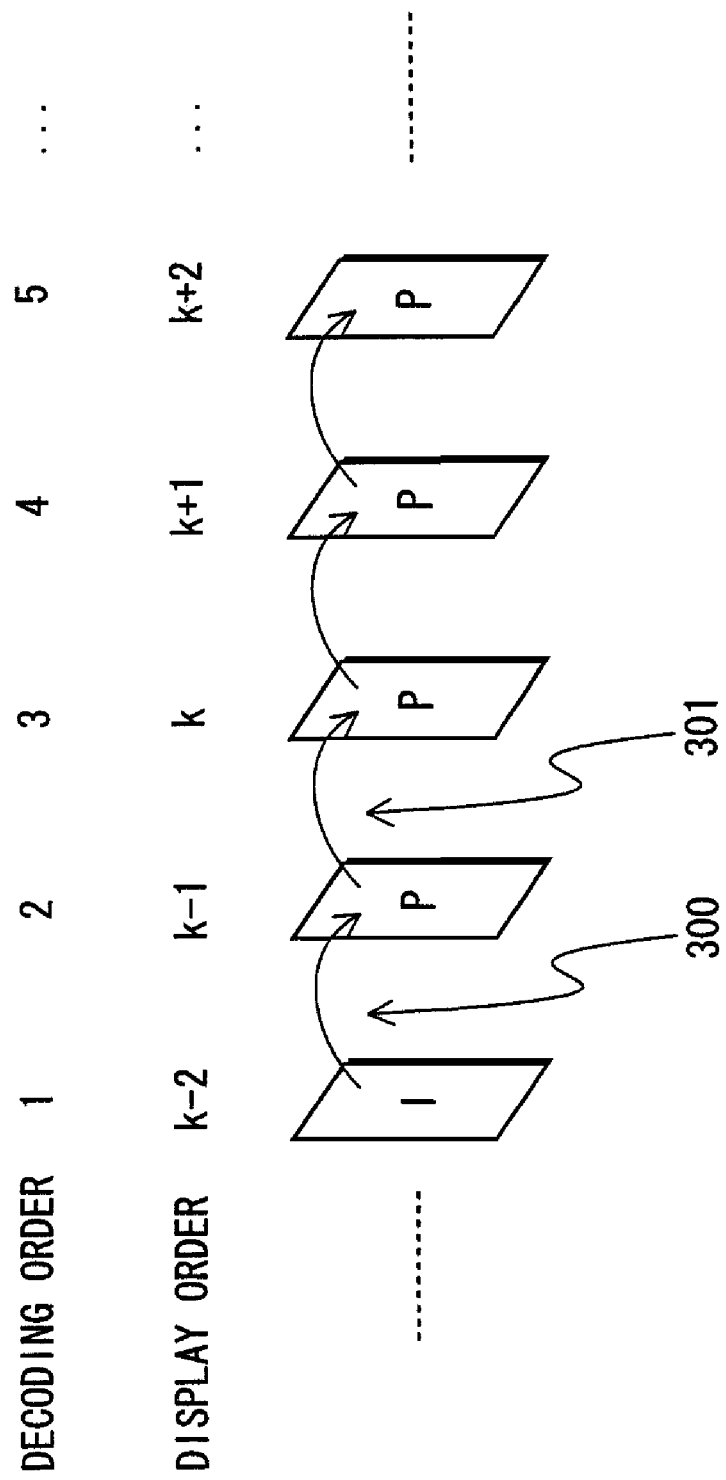
FIG. 6 shows an example of moving picture data of which the order in which the pictures are decoded is the same as the order in which the pictures are displayed.

FIG. 6 shows an example of moving picture data of which the order in which the pictures are decoded is the same as the order in which the pictures are displayed. The rectangles represent pictures, and the notation "I", "P" or "B" in each rectangle shows which of an I picture, a P picture and a B picture the picture represented by the rectangle is. The arrows represent referencing of pictures. This is the same for FIG. 8.

In the moving picture data shown in FIG. 6, a picture to be displayed references a picture displayed directly previously. Pictures are displayed in the order of IPPPP types.

For instance, a picture that is "k−1"-th in the display order makes a reference 300 to a picture that is "k−2"-th in the display order, and a picture that is "k"-th in the display order makes a reference 301 to the picture that is "k−1"-th in the display order.

Figure 7:
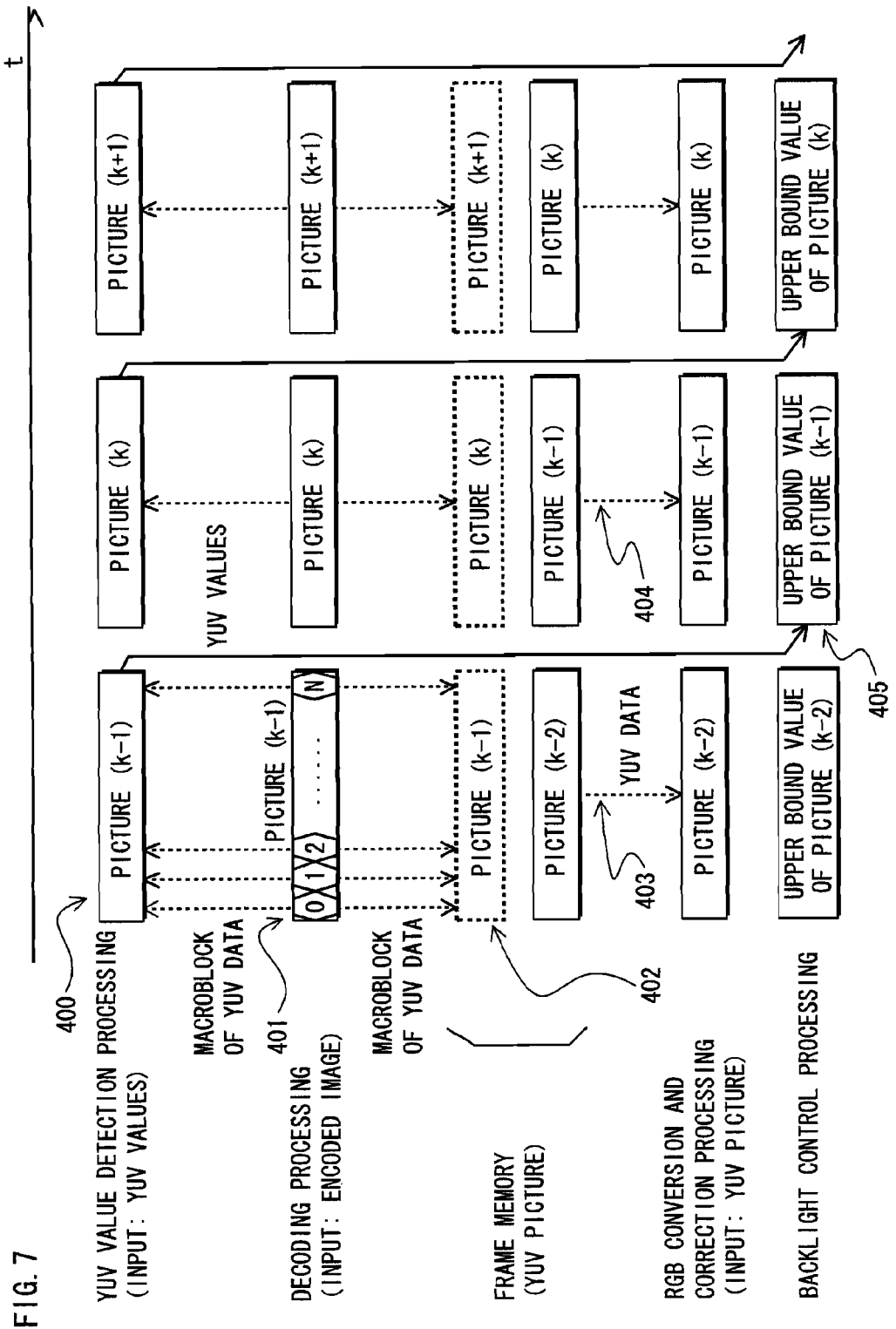
FIG. 7 is a timing chart of when the moving picture data shown in FIG. 6 is displayed.

The timing of the processing in the case of displaying the moving picture data of FIG. 6 is described using FIG. 7. FIG. 7 is a timing chart of when the moving picture data shown in FIG. 6 is displayed.

As in FIG. 4, the rectangles in FIG. 6 show when processing is performed. Furthermore, "picture (k−1)" in a rectangle expresses the picture that is "k−1"-th in the display order. This applies similarly to the other rectangles and pictures.

The YUV value detection processing in the first row is performed by the YUV value detection unit 1200, and the decoding processing in the second row is performed by the decoding unit 1100. The hexagons in the rectangle that represents decoding processing show macroblock decoding processing, and the number in each hexagon shows the number of a macroblock. Although macroblock numbers are illustrated only in the rectangle representing picture (k−1) in FIG. 6, this applies similarly to the other pictures.

The frame memory in the third row shows when the YUV pictures are stored in the frame memory 1300. The rectangles having broken lines express pictures in the process of being created, and the rectangles having the solid lines express pictures that have already been created.

The RGB conversion and correction processing in the fourth row is performed by the YUV-RGB conversion unit 4000 and the contrast correction unit 5000, and the backlight control processing in the fifth row is performed by the backlight control unit 3000.

Furthermore, the broken line arrows show output of decoded data, and the solid line arrows show output of YUV values. This is the same in FIG. 9.

A description is now given of the case of displaying the picture (k−1).

First, decoding processing 401 of the picture (k−1) is performed. Decoded YUV data is output one macroblock at a time to the YUV value detection unit 1200 and the frame memory 1300.

The YUV value detection unit 1200 receives the macroblock of YUV data, compares the YUV values with the YUV values of previously-received macroblocks, and performs YUV value detection processing 400 to find the maximum values and the minimum values of the YUV values.

In parallel to this, the frame memory 1300 accumulates macroblocks of YUV data, and performs processing 402 to complete the YUV picture. At the same time, the frame memory 1300 also performs processing 403 to output YUV data of the picture (k−2) to the YUV-RGB conversion unit 4000.

When display of the picture (k−1) commences after the picture (k−2) is displayed, the frame memory 1300 commences processing 404 to output the YUV data of the picture (k−1) to the YUV-RGB conversion unit 4000, and the backlight control unit 3000 performs backlight control processing 405 based on the upper bound value of the picture (k−1) calculated from the YUV values of the picture (k−1) found by the YUV value detection unit 1200.

When the Decoding Order and the Display Order are Different

Figure 8:
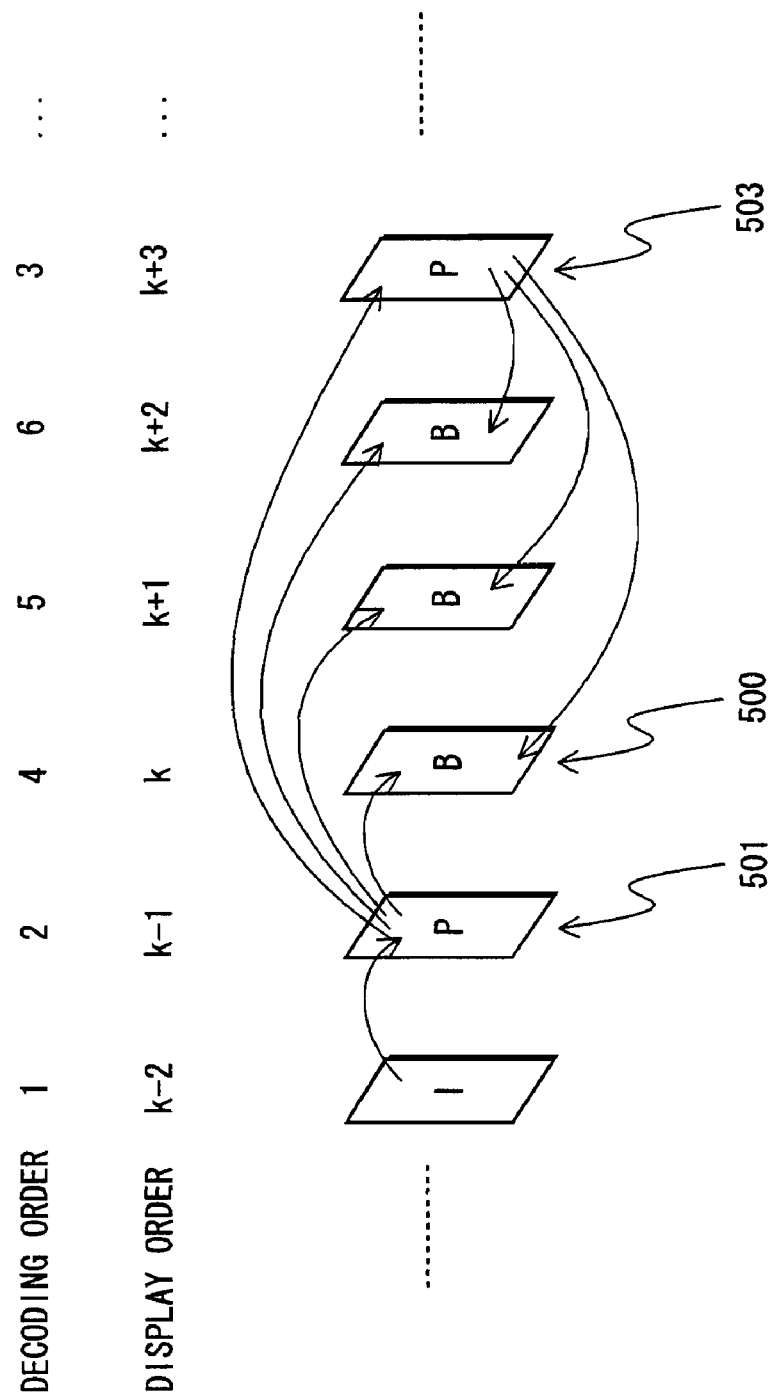
FIG. 8 shows an example of moving picture data of which the order in which pictures are decoded and the order in which the pictures are displayed are different.
Figure 9:
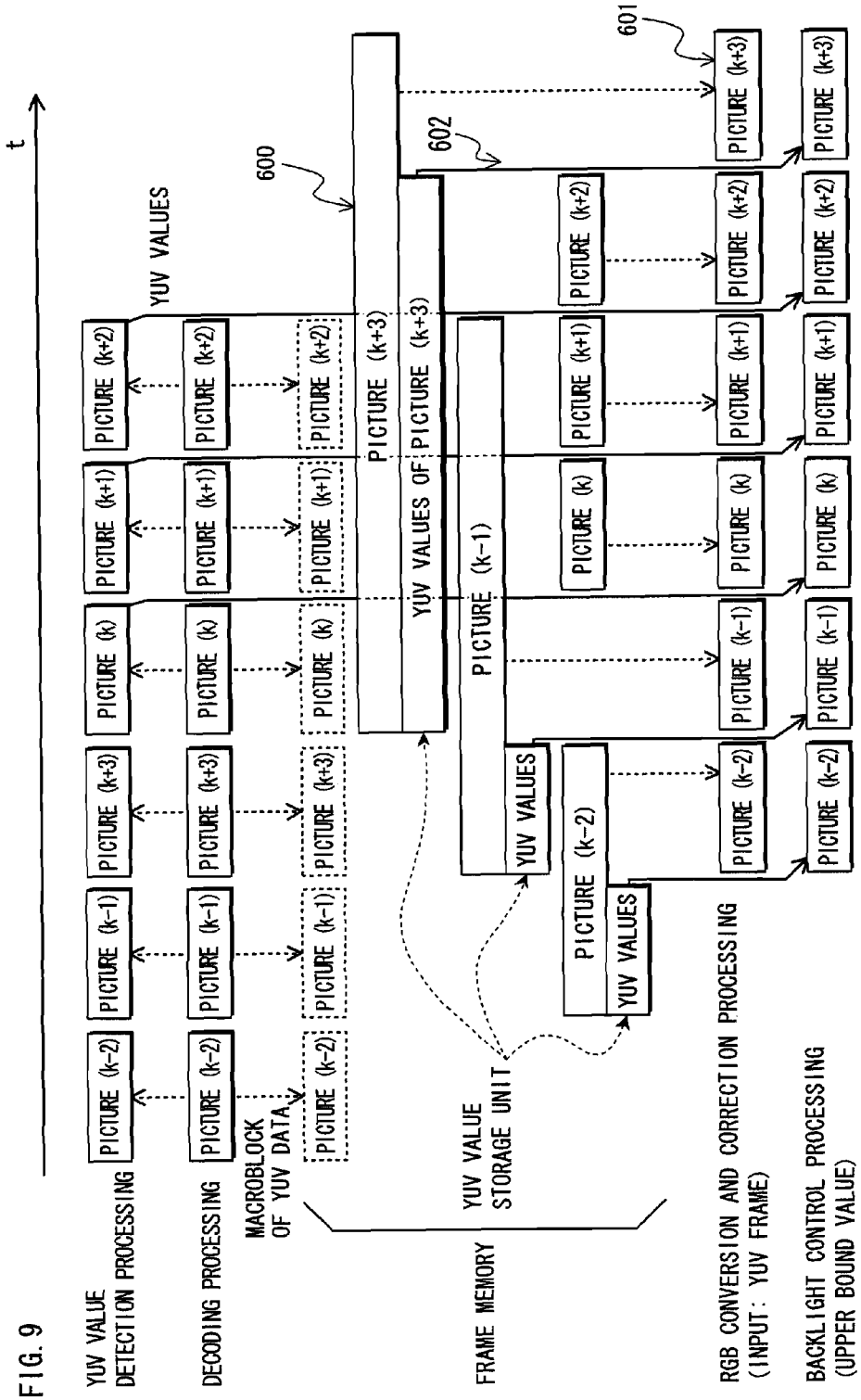
FIG. 9 is a timing chart of when the moving picture data shown in FIG. 8 is displayed.

Referring to FIGS. 8 and 9, a description is now given of the timing of processing when displaying moving picture data for which the decoding order and the display order are different.

FIG. 8 shows an example of moving picture data for which the order in which pictures are decoded and the order in which the pictures are displayed are different.

For instance, a picture 500 that is "k"-th in the display order is a B picture that references a picture 501 that is "k−1"-th in the display order and a picture 503 that is "k+3"-th in the display order. Therefore, the picture 503 that is "k+3"-th in the display order, in other words, is subsequent in the display order, is decoded before the picture 500 that is "k"-th in the order is.

Referring to FIG. 9, a description is now given of the timing of processing for displaying the moving picture data of FIG. 8. FIG. 9 is a timing chart of when the moving picture data shown in FIG. 8 is displayed.

The timing of the processing shown in FIG. 9 is basically the same as the timing shown in FIG. 7, but differs in that pictures whose decoding processing and display processing are not consecutive are stored in the frame memory longer and the YUV values thereof are stored.

For example, a storage time 600 in the frame memory is the time for which the picture (k+3) is stored in the frame memory until being displayed. When displaying this picture (k+3), the YUV values 602 of this picture (k+3) stored in the YUV value storage unit 1210 is used.

The display of the picture (k) is performed using the YUV values for which the picture number field 1221 shows "k" in the YUV value storage unit 1210. When this display is performed, the YUV values for which the picture number field 1221 shows "k+3" has already been stored (see FIG. 3). This is because the picture (k+3) has already been decoded.

Moving Picture Data Display Processing

Figure 10:
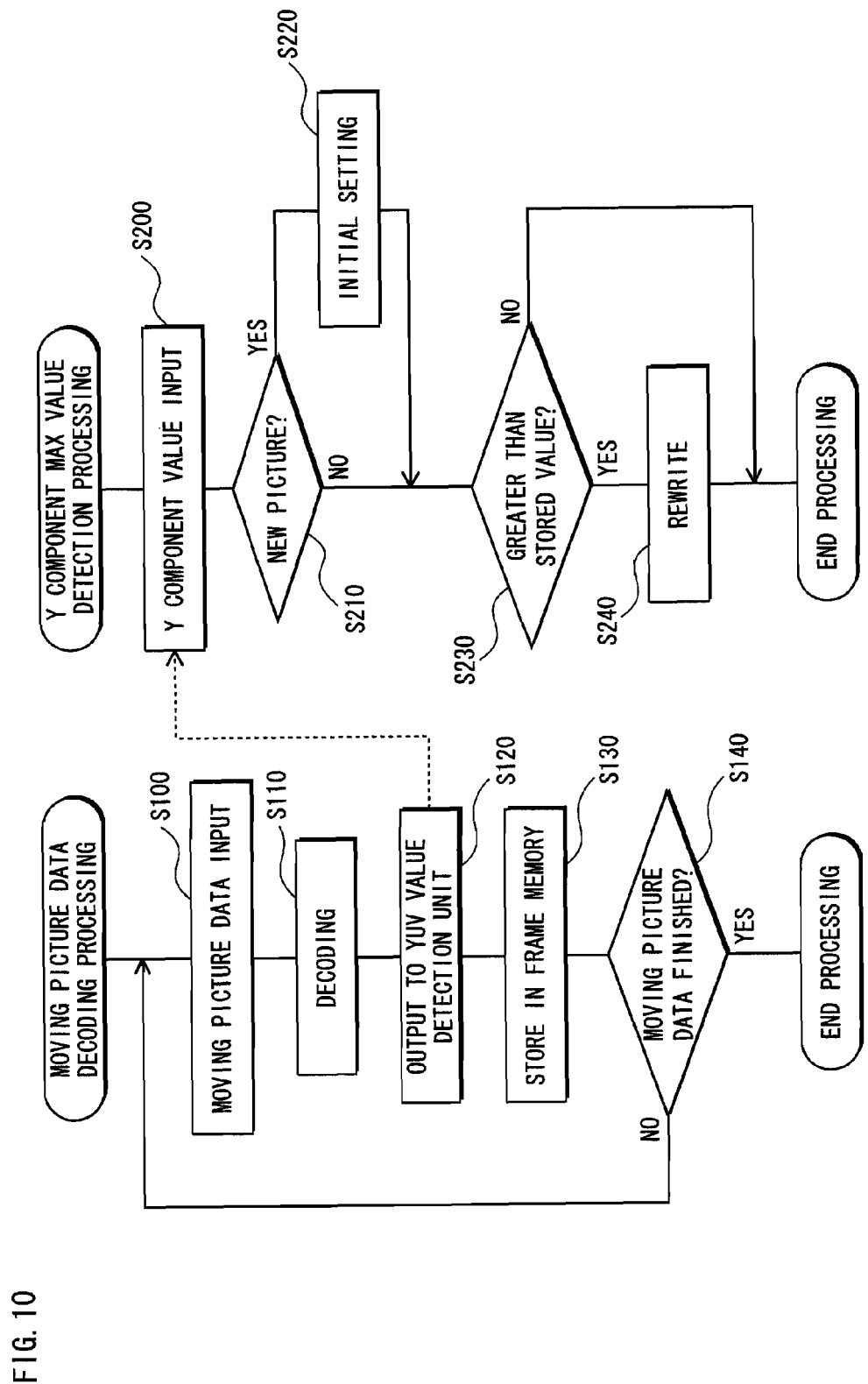
FIG. 10 is a flowchart expressing moving picture data decoding processing and YUV value detection processing.
Figure 11:
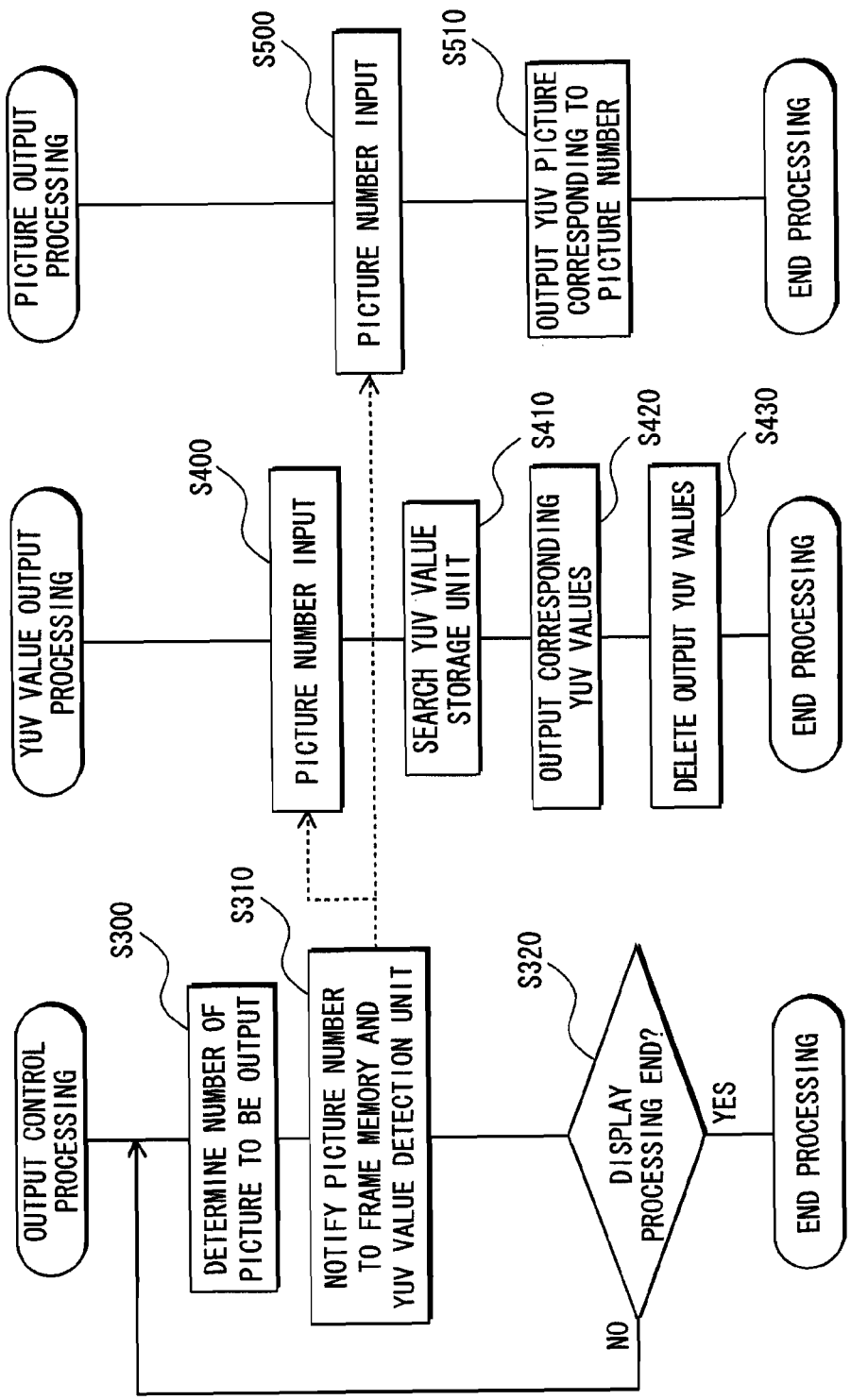
FIG. 11 is a flowchart showing processing for controlling output of a YUV picture and YUV values, processing for outputting YUV values, and processing for outputting a picture.

Referring to FIGS. 10 and 11, a description is now given of processing for displaying moving picture image data. Processing for decoding moving picture data and accumulating generated YUV pictures in the frame memory is described using FIG. 10, and processing for displaying the pictures accumulated in the frame memory is described using FIG. 11.

These two processes are carried out in parallel in the case of moving picture data being received and displayed.

Processing for Accumulating a YUV Picture in the Frame Memory

FIG. 10 is a flowchart expressing moving picture data decoding processing and YUV value detection processing. The broken line arrow shows the flow of data. Furthermore, it should be noted that a flowchart is shown only for the case of finding the maximum value of the Y component in the YUV value detection processing. In reality, the maximum value and the minimum value of each of the U component and the V component are found using the same kind of procedure.

The processing for decoding the moving picture data is performed by the decoding unit 1100, and the YUV value detection processing is performed by the YUV value detection unit 1200.

First, moving picture data is input into the decoding unit 1100 (step S100).

The decoding unit 1100 subjects the input moving image data to decoding processing by means of the variable length decoding unit 1110, the reverse quantization and reverse orthogonal conversion unit 1120 and such, and generates YUV-format macroblocks (hereinafter referred to as YUV macroblocks) (step S110).

The decoding unit 1100 outputs the generated YUV macroblocks to the YUV value detection unit 1200 (step S120), and also stores the generated YUV macroblocks to the frame memory 1300 (step S130).

Here, when the picture to which a macroblock belongs changes, in other words, when the macroblock being decoded is a macroblock belonging to a new picture, the decoding unit 1100 sends notification to such effect, and notification of the number of the new picture, to the YUV value detection unit 1200 and the frame memory 1300.

The frame memory 1300 stores and manages the YUV macroblocks belonging to each picture number together in correspondence with their picture number.

Meanwhile, having received input of a YUV macroblock (step S200), the YUV value detection unit 1200 judges whether or not the input macroblock belongs to a new picture (step S210). The YUV value detection unit 1200 makes the judgment in accordance with notification from the decoding unit 1100.

If the macroblock is judged to belong to a new picture (step S210: YES), the YUV value detection unit 1200 performs initial setting (step S220). The initial setting performed here is the addition of the new picture number to the YUV component information 1220 (see FIG. 3) stored in the YUV value storage unit 1210. More specifically, the notified picture number is added to a picture number field 1221, "0 (zero)" is set in the corresponding Y component max value field 1222, U component max value field 1223, and V component max value field 1225, and "255" is set in the corresponding U component min value field 1224 and V component min value field 1226.

Next, the YUV value detection unit 1200 finds the greatest of the Y component values of each pixel of the received YUV macroblock, and judges whether or not this greatest value is greater than the value shown in the corresponding Y component max value field 1222 in the YUV component information 1220 (step S230). Note that the corresponding Y component max value field 1222 is the Y component max value field 1222 that corresponds to the picture number field 1221 showing the picture to which the received macroblock belongs.

When the found value is greater than the value shown in the Y component max value field 1222 (step S230: YES), the YUV value detection unit 1200 overwrites the value shown in the Y component max value field 1222 with the found value (step S240). When the found value is less than the value shown in the Y component max value field 1222 (step S230: NO), the YUV value detection unit 1200 does not overwrite the value shown in the Y component max value field 1222.

Note that in the case of the U component maximum value field 1223, the YUV value detection unit 1200 finds the maximum value among the U components of the pixels of the YUV block, and when the found U component maximum value is greater than the value shown in the U component min value field 1223 in the YUV component information 1220, the YUV value detection unit 1200 overwrites the value shown in the U component max value field 1223 with the found U component maximum value. Similarly, in the case of the value shown in the V component maximum value field 1225, the YUV value detection unit 1200 finds the maximum value among the V components of the pixels of the YUV block, and when the found V component maximum value is greater than the value shown in the V component max value field 1225 in the YUV component information 1220, the YUV value detection unit 1200 rewrites the value shown in the V component max value field 1225 with the found value. When the found V component maximum value is less than the value shown in the V component max value field 1225, the YUV value detection unit 1200 does not overwrite the value shown in the V component max value field 1225.

When finding the U component minimum value, the YUV value detection unit 1200 finds the minimum value among the U component values of the pixels of the YUV block, and when the found value is less than the value shown by the U component min value field 1224 in the YUV component information 1220, the YUV value detection unit 1200 overwrites the value shown in the U component min value field 1224 with the found value. When the found value is greater than the value shown in the U component min value field 1224, the YUV value detection unit 1200 does not overwrite the value shown in, the U component min value field 1224. Similarly, when finding the V component minimum value, the YUV value detection unit 1200 overwrites the value shown in the V component min value field 1226 in the YUV component information with the found value, and when the found value is less, does not overwrite the value shown by the V component min value field 1226.

The processing of steps S100 to s130 is repeatedly performed until the moving picture data is finished (step S140).

Processing for Displaying a Picture Stored in the Frame Memory

FIG. 11 is a flowchart showing processing for controlling output of a YUV picture and YUV values, processing for outputting YUV values, and processing for outputting a picture. The broken arrows in FIG. 11 represent the flow of data.

The output control processing for the YUV picture and the YUV values is performed by the decoding control unit 1000, and the YUV value output processing and the picture output processing are performed by the YUV value detection unit 1200 and the frame memory 1300, respectively.

First, the decoding control unit 1000 refers to the pictures stored in the frame memory 1300, to determine the picture number of the picture to display (step S300). The picture to be displayed is determined based on information showing display time. This information is included in the data of the picture.

Next, at the time that the picture is to be displayed, the decoding control unit 1000 notifies picture number of the picture to be displayed to the YUV value detection unit 1200 and the frame memory 1300 (step S310).

The decoding control unit 1000 repeatedly performs step S300 and step S310 until picture display processing ends (step S320).

Having received input of the picture number from the decoding control unit 1000 (step S400), the YUV value output unit 1200 searches the picture number fields 1221 in the YUV component information 1220 stored in the YUV value storage unit 1210 (step S410), and outputs the YUV values shown by the Y component max value field 1222 through to the V component min value field 1226 corresponding to the input picture number, to the upper bound value calculation unit 2000 (step S420).

The YUV value output unit 1200 deletes the data of the input picture number (step S430). This is because the corresponding picture is not longer needed after having been displayed.

Meanwhile, having received the picture number from the decoding control unit 1000 (step S500), the frame memory 1300 outputs the YUV-format data of the picture corresponding to the input picture number, to the YUV-RGB conversion unit 4000 (step S510).

Second Embodiment

The second embodiment is a digital television that uses the moving picture display apparatus of the first embodiment.

Figure 12:
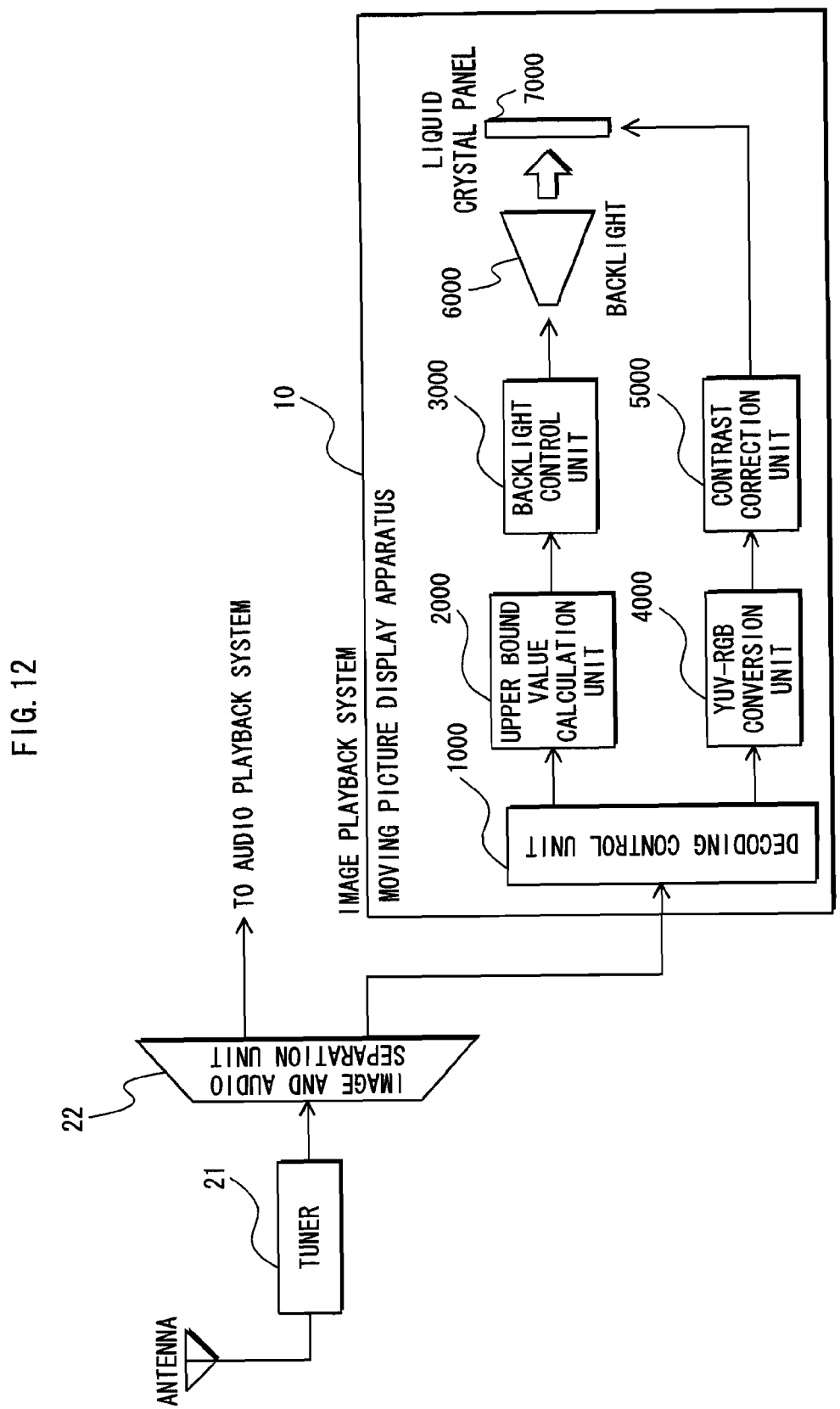
FIG. 12 is a block diagram showing part of a digital television of a second embodiment of the present invention.

FIG. 12 is a block diagram showing part of the digital television of the second embodiment. The moving picture display apparatus 10 is the same as that described in the first embodiment (see FIG. 1). Note that in FIG. 12 only function blocks relating to the image playback system are illustrated, with blocks and the like relating to the audio playback system being omitted from the drawing.

In FIG. 12, a tuner 21 performs channel selection, modulation and demodulation of a received broadcast wave in order to generate a signal having images, audio and the like multiplexed thereon.

An image and audio separation unit 22 separates image data, audio data and other data (not illustrated) from the multiplexed signal. The image playback system is composed of the moving picture display apparatus 10, and has the functions of receiving image data from the image and audio separation unit 22, decoding the received image data, and displaying images resulting from the decoding.

A description is now given of the operations of the digital television of the second embodiment of the present invention.

The broadcast wave received by the antenna is subjected to channel selection and demodulation by the tuner 21. The resultant television signal on which images, audio and the like are multiplexed is output to the image and audio separation unit 22. The image and audio separation unit 22 separates an image stream and an audio stream from the multiplex stream, and sorts the data such that each piece of the data is output to either the image playback system or the audio playback system as appropriate.

Here, the moving picture stream, in other words, the moving picture data, is processed as described in the moving picture display apparatus 10, with backlight control and contrast correction being performed suitably for each picture being displayed, and optimum display of the moving pictures of the television signal being performed.

The audio data is output to the audio playback system (not illustrated), and subjected to audio decoding processing so as to be converted into an audio signal. The audio signal is output as audio by a speaker, thus serving as the audio component of television viewing.

As described, with the digital television of the present embodiment, since backlight control and contrast correction are performed based on values obtained from the image being displayed as in the first embodiment, the appropriate light source intensity control achieves the effect of reducing power consumption and heat emission by the light source. Therefore, power consumption and heat emission can be reduced in the digital television.

Furthermore, since backlight control and contrast correction are performed based on RGB upper bound values that are not below all the RGB data of a picture, the problems of insufficient light source intensity and saturation of corrected RGB data are eliminated, and this realizes a digital television that has the effects of reducing power consumption and heat emission and also has favorable color reproduction.

<Supplementary Remarks>

Although embodiments of the present invention have been described, the present invention is not limited to the described embodiments, and may be as follows.

(1) Instead of performing backlight control based on RGB upper bound values found from YUV values as in the embodiments, backlight control may be performed based on the maximum value of the Y component.

(2) Although YUV values are stored for each picture in the embodiments, instead of YUV values, upper bound values may be stored for each picture.

In such a case, for example, the processing performed by the upper bound value calculation unit 2000 is performed by the YUV value detection unit 1200, and the calculated upper bound value is stored in correspondence with the picture number.

(3) Although the upper bound value that is the output of the upper bound value calculation unit 2000 is used as a control value by the backlight control unit 3000 and the contrast correction unit 5000 in the embodiments, the control value may instead be a value that has been put through a filter in order to reduce flickering caused by sudden fluctuations in the intensity of the backlight.

For instance, with respect to sharp increases in luminosity that occur when switching from a low-luminosity picture to a high-luminosity picture, it is necessary to perform follow up using the control value as is. However, with respect to sharp drops in luminosity, it is possible, for instance, to subject the control value to low pass filtering.

(4) Although the upper bound value output from the upper bound value calculation unit 2000 is given to both the backlight control unit 3000 and the control correction unit 5000 in the embodiments, as an alternative, different values may be given. For example, a value calculated from the upper bound value may be given to the backlight control unit 3000, and a correction value from a table created in advance in accordance with upper bound values may be given to the contrast correction unit 5000.

(5) Although the embodiments describe a transmissive display apparatus that uses a single white light source, the present invention can achieve the same kind of effects in an image display apparatus that displays using a prism to consolidate video of the three primary colors red, green and blue.

In the case of an image display apparatus that displays using a prism to consolidate video of the three primary colors, the amount of light transmitted is controlled respectively for each of the three light sources of each of the primary colors. Therefore, the structure of the present embodiment is provided for each of the three light sources, and each light source is controlled using the respective one of R'u, G'u and B'u instead of using the upper bound value M'.

(6) Although the embodiments give an example of a transmissive panel provided as a moving picture display apparatus that displays images by controlling the ratio of the amount of light transmitted for each pixel, the same kind of effects can be obtained in a reflective image moving picture display apparatus that performs image display by controlling the ratio of light amount reflected by a mirror controlled according to PWM control for each pixel.

Furthermore, although the embodiments relate to a transmissive liquid crystal panel, other moving picture display apparatuses that perform image display by controlling the ratio of the light amount transmitted for each pixel include transmissive or reflective liquid crystal panels, liquid crystal projectors, and micro mirror projectors.

(7) Although the tuner 21 is provided as a reception unit for receiving packets including a television signal in the second embodiment, the tuner 21 may be replaced with a network connection unit that receives a television signal via a network.

(8) The moving picture display apparatus may be realized by all or part of the compositional elements in FIG. 1 and FIG. 2 being a single chip or multiple chip integrated circuit.

(9) The moving picture display apparatus may be realized by all or part of the compositional elements in FIG. 1 and FIG. 2 being a computer program, or any other form.

In the case of a computer program, the computer program may be in the form of a computer program written on a recording medium such as a memory card or a CD-ROM, and a computer may be caused to read and executed the computer program from the recording medium, or the computer program may be in a form that is downloaded via a network, and the computer is caused to executed the downloaded program.

INDUSTRIAL APPLICABILITY

The present invention can be applied to an apparatus that performs display of predictive-encoded moving picture image data by controlling a ratio of a light amount transmitted for each pixel.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A moving picture display apparatus for displaying moving picture data generated by encoding according to a predictive encoding method, the moving picture display apparatus comprising:
a liquid crystal panel unit;
a light source operable to illuminate the liquid crystal panel unit;
a decoding unit operable to decode the moving picture data according to a decoding method corresponding to the predictive encoding method, so as to generate a plurality of YUV pictures, each YUV picture, of the plurality of YUV pictures, being composed of, for each pixel of a display screen, a Y component that is a piece of luma data, a U component that is chrominance data and a V component that is chrominance data;
a display control unit operable to convert each YUV picture, of the plurality of YUV pictures, pixel by pixel into a set of primary color data composed of an R component, a G component and a B component, and operable to execute contrast control while causing the liquid crystal panel to display the sets of the primary color data of each YUV picture of the plurality of YUV pictures;
a YUV value detection unit operable to, while the decoding unit is generating each YUV picture of the plurality of YUV pictures, detect YUV value information including a maximum value of the luma data in one YUV picture, of the plurality of YUV pictures, currently being generated; and
a light source control unit operable to control an amount of light emitted by the light source, the amount of light being controlled based on the YUV value information detected from the one YUV picture that the display control unit is currently causing the liquid crystal panel unit to display,
wherein the YUV value information of each respective YUV picture, of the plurality of YUV pictures, further includes a maximum value and a minimum value of the chrominance data of the U component and the chrominance data of the V component of the respective YUV picture,
wherein the moving picture display apparatus further comprises an upper bound value calculation unit operable to find, for each respective YUV picture, an upper bound value of all of the sets of the primary color data of the respective YUV picture, based on the detected YUV information of the respective YUV picture, and
wherein the light source control unit controls the amount of light based on the upper bound value found with respect to the one YUV picture that the display control unit is causing the liquid crystal panel unit to display.

2. The moving picture display apparatus of claim 1,
wherein the upper bound value calculation unit finds, for each respective YUV picture, upper bound values Ru, Gu and Bu of the R component, the G component and the B component, respectively, in all of the sets of the primary color data for the respective YUV picture, and selects one of the Ru, Gu and Bu values having a greatest value as the upper bound value, and
wherein the upper bound value calculation unit finds the upper bound values Ru, Gu and Bu according to the following operations derived from a triangle inequality in a max norm and a conversion formula for converting to primary color data:

$Ru = Y\max + 1.40 V\max;$ $Gu = Y\max + 0.34 U\min + 0.71 V\min;$ and $Bu = Y\max + 1.77 U\max,$ where Y max is a maximum value of luma data in the respective YUV picture, Umax and Vmax are each a maximum value of a respective one of the chrominance data, and Umin and Vmin are minimum values of a respective one of the chrominance data.

3. The moving picture display apparatus of claim 1,
wherein the light source emits red light, green light and blue light,
wherein the upper bound value calculation unit finds, for each respective YUV picture, upper bound values Ru, Gu and Bu of the R component, the G component and the B component, respectively, in all of the sets of the primary color data for the respective YUV picture,
wherein the upper bound value calculation unit finds the upper bound values Ru, Gu and Bu according to the following operations derived from a triangle inequality in a max norm and a conversion formula for converting to primary color data:

$Ru = Y\max + 1.40 V\max;$ $Gu = Y\max + 0.34 U\min + 0.71 V\min;$ and $Bu = Y\max + 1.77 U\max,$ where Y max is a maximum value of luma data in the respective YUV picture, Umax and Vmax are each a maximum value of a respective one of the chrominance data, and Umin and Vmin are minimum values of a respective one of the chrominance data, and
wherein the light source control unit controls the amount of light emitted by the light source with respect to the one YUV picture being displayed by the liquid crystal panel unit, by controlling an amount of each of the red light, green light and blue light that the light source emits, based on the respective one of the found upper bound values Ru, Gu and Bu of the one YUV picture that the display control unit is causing to be displayed.

4. The moving picture display apparatus of claim 1, wherein, while the decoding unit generates each respective YUV picture, the YUV value detection unit performs in parallel the detection of the YUV value information of the YUV picture being generated.

5. The moving picture display apparatus of claim 1,
wherein the decoding unit includes a storage unit operable to store each detected YUV value information in correspondence with information specifying a corresponding YUV picture, of the plurality of YUV pictures, when the plurality of YUV pictures are being generated, and wherein the light source control unit performs the control of the light amount emitted by the light source based on the YUV information stored in correspondence with the information specifying the one YUV picture, of the plurality of YUV pictures, that the display control unit is causing the liquid crystal panel to display.

6. A moving picture display method used in a moving picture display apparatus for displaying moving picture data generated by encoding according to a predictive encoding method, the moving picture display apparatus including a liquid crystal panel unit and a light source operable to illuminate the liquid crystal panel unit, and the moving picture display method comprising:
- a decoding step of decoding the moving picture data according to a decoding method corresponding to the predictive encoding method, so as to generate a plurality of YUV pictures, each YUV picture, of the plurality of YUV pictures, being composed of, for each pixel of a display screen, a Y component that is a piece of luma data, U component that is chrominance data and a V component that is chrominance data;
- a display control step of converting each YUV picture, of the plurality of YUV pictures, pixel by pixel into a set of primary color data composed of an R component, a G component and a B component, and of executing contrast control while causing the liquid crystal panel to display the sets of the primary color data of each YUV picture of the plurality of YUV pictures;
- a YUV value detection step of, while the decoding step is generating each YUV picture of the plurality of YUV pictures, detecting YUV value information including a maximum value of the luma data in one YUV picture, of the plurality of YUV pictures, currently being generated; and
- a light source control step of controlling an amount of light emitted by the light source, the amount of light being controlled based on the YUV value information detected from the one YUV picture that the display control step is currently causing the liquid crystal panel unit to display,
- wherein the YUV value information of each respective YUV picture, of the plurality of YUV pictures, further includes a maximum value and a minimum value of the chrominance data of the U component and the chrominance data of the V component of the respective YUV picture,
- wherein the moving picture display method further comprises finding, for each respective YUV picture, an upper bound value of all of the sets of the primary color data of the respective YUV picture, based on the detected YUV information of the respective YUV picture, and
- wherein the light source control step controls the amount of light based on the upper bound value found with respect to the one YUV picture that the display control step is causing the liquid crystal panel unit to display.

7. An integrated circuit used in a moving picture display apparatus for displaying moving picture data generated by encoding according to a predictive encoding method, the moving picture display apparatus including a liquid crystal panel unit and a light source operable to illuminate the liquid crystal panel unit, the integrated circuit comprising:
- a decoding unit operable to decode the moving picture data according to a decoding method corresponding to the predictive encoding method, so as to generate a plurality of YUV pictures, each YUV picture, of the plurality of YUV pictures, being composed of, for each pixel of a display screen, a Y component that is a piece of luma data, a U component that is chrominance data and a V component that is chrominance data;
- a display control unit operable to convert each YUV picture, of the plurality of YUV pictures, pixel by pixel into a set of primary color data composed of an R component, a G component and a B component, and operable to execute contrast control while causing the liquid crystal panel to display the sets of the primary color data of each YUV picture of the plurality of YUV pictures;
- a YUV value detection unit operable to, while the decoding unit is generating each YUV picture of the plurality of YUV pictures, detect YUV value information including a maximum value of the luma data in one YUV picture, of the plurality of YUV pictures, currently being generated; and
- a light source control unit operable to control an amount of light emitted by the light source, the amount of light being controlled based on the YUV value information detected from the one YUV picture that the display control unit is currently causing the liquid crystal panel unit to display,
- wherein the YUV value information of each respective YUV picture, of the plurality of YUV pictures, further includes a maximum value and a minimum value of the chrominance data of the U component and the chrominance data of the V component of the respective YUV picture,
- wherein the moving picture display apparatus further comprises an upper bound value calculation unit operable to find, for each respective YUV picture, an upper bound value of all of the sets of the primary color data of the respective YUV picture, based on the detected YUV information of the respective YUV picture, and
- wherein the light source control unit controls the amount of light based on the upper bound value found with respect to the one YUV picture that the display control unit is causing the liquid crystal panel unit to display.

* * * * *